United States Patent
Vummadisetty et al.

(10) Patent No.: US 12,490,177 B2
(45) Date of Patent: Dec. 2, 2025

(54) SYSTEM AND METHODS FOR EXPOSING USER-DRIVEN ANALYTICS FOR EDGE APPLICATIONS

(71) Applicant: Verizon Patent and Licensing Inc., Basking Ridge, NJ (US)

(72) Inventors: Urvika Vummadisetty, Hyderabad (IN); Raghuram Parvataneni, Plano, TX (US); John Patrick Hickey, III, Metuchen, NJ (US); Parry Cornell Booker, Sunnyvale, TX (US)

(73) Assignee: Verizon Patent and Li ensing Inc., Basking Ridge, NJ (US)

( * ) Notice: Subject to any disclaimer, the term of this patent is extended or adjusted under 35 U.S.C. 154(b) by 394 days.

(21) Appl. No.: 17/810,148

(22) Filed: Jun. 30, 2022

(65) Prior Publication Data
US 2024/0007937 A1    Jan. 4, 2024

(51) Int. Cl.
*H04W 48/18*  (2009.01)
*H04W 8/20*   (2009.01)
*H04W 24/10*  (2009.01)
*H04W 76/10*  (2018.01)

(52) U.S. Cl.
CPC ........... *H04W 48/18* (2013.01); *H04W 8/205* (2013.01); *H04W 24/10* (2013.01); *H04W 76/10* (2018.02)

(58) Field of Classification Search
CPC ..... H04W 48/18; H04W 8/205; H04W 24/10; H04W 76/10
See application file for complete search history.

(56) References Cited

U.S. PATENT DOCUMENTS

| | | | |
|---|---|---|---|
| 8,935,319 B2 * | 1/2015 | Calo | H04W 4/00 709/203 |
| 2021/0314906 A1 * | 10/2021 | Matolia | H04W 24/10 |
| 2023/0412698 A1 * | 12/2023 | Kim | H04W 88/18 |

OTHER PUBLICATIONS

3GPP TR 23.700-36 V0.3.0 (May 2022) 3rd Generation Partnership Project; Technical Specification Group Services and System Aspects; Study on Application Data Analytics Enablement Service; (Release 18) (Year: 2022).*

3GPP TS 23.288 V17.5.0 (Jun. 2022) Published Jun. 15, 2022 (Year: 2022).*

* cited by examiner

*Primary Examiner* — Charles C Jiang
*Assistant Examiner* — Margaret Marie Anderson (57) ABSTRACT

Systems and methods described herein provide an application function and interface for a Network Data Analytics Function (NWDAF) to receive, from User Equipment (UE) devices, user data for edge applications. An NWDAF receives an analytics request for user analytics for an edge application and sends, to an Edge Analytics Engine (EAE) associated with an edge location, a data request based on the analytics request. The EAE receives user data from an Edge Enabler Client (EEC) on the UE device that is connected to the edge location. The EAE forwards the user data to the network device. The NWDAF receives the user data responsive to the analytics request and generates an analytics report based on the user data.

20 Claims, 9 Drawing Sheets

510 —
APIOperationName: Eeec_UECapabilityExposure_Register
Description: The UE device requests to register EEC with EAE
Input: EEC ID, UE ID, Security Credentials
Output: Successful Registration, RegistrationID 520 —
APIOperationName: Eeec_UECapabilityExposure_Notify
Description: EEC notifies metrics to EAE
Notification: AC Profile, EEC ID, UE ID, Device Profile, ExperiencedUserThrougput, UEEnergyConsumption, RegistrationID, UserFeedback/Experience metric 530 —
APIOperationName: Eeec_UECapabilityExposure_DeRegister
Description: The UE device requests to deregister the EEC with EAE
Input: EEC ID, Security Credentials
Output: Success Response

FIG. 5A

540 — APIOperationName:Naf/eae_EventExposure_Subscribe
Description: NWDAF subscribes to EAE
Input: {Event ID: UEData, Event Filter Information: Application ID/EEC ID, Target of Event Reporting: Any UE}
Output: Success Response 550 — APIOperationName:Naf/eae_EventExposure_Notify
Description: EAE notifies UE Data to NWDAF
Notification: {Application ID, Correlation ID, User Experience metrics, Device stats}

560 — APIOperationName:Naf/eae_EventExposure_Unsubscribe
Description: NWDAF unsubscribes to EAE
Input: {Event ID: UEData}
Output: Success Response

FIG. 5B

570 — APIOperationName:Nnwdaf_AnalyticsInfo_request
Description: NF Consumer subscribes to NWDAF for UE data
Input: AnalyticsID: UserCapability
Output: UserAnalytics 580 — APIOperationName:Nnwdaf_AnalyticsInfo_response
Description: NWDAF provides user analytics to NF Consumer
Input: AnalyticsID: UserCapability
Output: UserAnalytics

FIG. 7

SYSTEM AND METHODS FOR EXPOSING USER-DRIVEN ANALYTICS FOR EDGE APPLICATIONS

BACKGROUND

One enhancement made possible through new broadband cellular networks is the use of Edge networks, also referred to as Multi-access Edge Computing (MEC) platforms. MEC platforms allow high network computing loads to be transferred onto edge servers. Depending on the location of the edge servers relative to the point of attachment (e.g., a wireless station for a user device), MEC platforms can provide various services and applications to user devices with minimal latency. However, MEC platforms have limited compute resources which must be managed carefully to maximize availability of the various services.

DETAILED DESCRIPTION OF EXAMPLE EMBODIMENTS

The following detailed description refers to the accompanying drawings. The same reference numbers in different drawings may identify the same or similar elements.

Compute resources are limited in edge networks. The applications making use of edge resources should be designed based on the constraints of the edge network. One approach to optimizing available resources in edge networks is to have distributed load handling among the edge nodes and central nodes. However, distributed load handling adds delay in processing data between the nodes.

Another approach to optimizing available resources in edge networks is to have an insight of user behavior of a corresponding edge location. Insight of user behavior can help in configuring applications to have optimized performance and edge resource utilization. As an example, in video streaming applications, video content is transcoded into different bit rates and stored in a server (e.g., an edge application server (EAS)), which requires a large amount of computation and storage. An application client sets the bit rate automatically or the user sets the bit rate based on, for example, rationing of a data plan. Edge resource consumption by the EAS can be reduced by storing only the encoded video content required for the respective application client(s). More particularly, if a specific edge location can know, in advance, certain user behavior data (e.g., the preferred bit rate for an application client), the EAS may apply the user behavior data to limit storage of encoded video content to only the needed formats.

More generally, benefits of user analytics for edge applications may include enabling optimal edge resource utilization by knowing the user analytics (video codecs, device type, viewing time) at each edge location. Furthermore, application providers may be able to know user behavior prior to deploying the application at an edge location. The user analytics may also help service providers to manage Quality of Experience (QoE) and improve users' network experience. The user analytics may further provide a way to understand users' usage and needs, which helps service providers direct more targeted delivery of edge services. Currently, there is no mechanism for knowing and applying user behavior data in edge network locations.

Systems and methods described herein provide an application function and interface for a Network Data Analytics Function (NWDAF) to receive, from User Equipment (UE) devices, user data for edge applications. As used herein, the term "edge application" may refer to an application that provides services from a network edge to an application client executed on a UE device.

According to an implementation, an NWDAF may receive an analytics request for user analytics for an edge application and send, to an application function associated with an edge location (referred to herein as an Edge Analytics Engine (EAE)), a data request based on the analytics request. The EAE may receive user data from an Edge Enabler Client (EEC) on the UE device that is connected to the edge location. The EAE may forward the user data to the network device. The NWDAF may receive the user data responsive to the analytics request and may generate an analytics report based on the user data. The analytic report may be generated by applying artificial intelligence (AI) and/or machine learning (ML) techniques to the user data to predict the UE behavior and optimize the utilization of edge computational resources.

Figure 1:
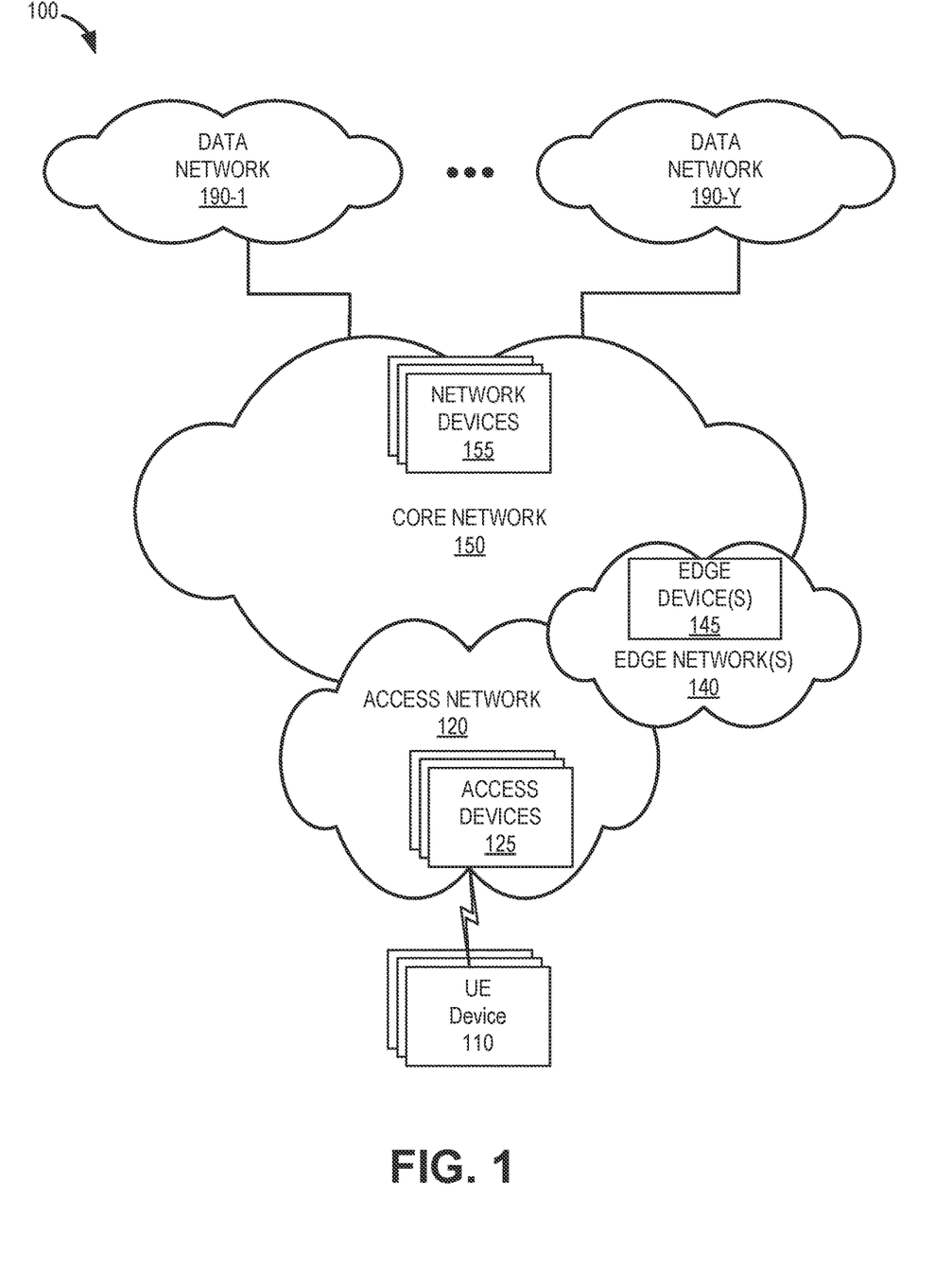
FIG. 1 is a diagram that depicts an exemplary network environment in which systems and methods described herein may be implemented.

FIG. 1 is a diagram of an example environment 100 in which the systems and/or methods, described herein, may be implemented. As shown in FIG. 1, environment 100 may include user equipment (UE) devices 110, a radio access network (RAN) 120 that includes access devices 125, edge networks 140 that include edge devices 145, a core network 150 that includes network devices 155, and data networks (DNs) 190-1 to 190-Y (referred to herein collectively as "DNs 190" and individually as "DN 190").

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player, a WiFi access point, fixed wireless access (FWA) device, a smart television, etc.; a portable gaming system; global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic delivery, and/or other types of capabilities. In some implementations, UE device 110 may communicate using machine-to-machine (M2M) communication, such as machine-type communication (MTC), and/or another type of M2M communication. In still other implementations, UE device 110 may include a Redcap (Reduced capability) device that is used for applications such as industrial wireless sensors.

Access network 120 may enable UE device 110 to connect to core network 150 and/or edge network 140 via access devices 125 using cellular wireless signals. Access device 125 may include a 5G New Radio (NR) base station (e.g., a gNodeB) and/or a Fourth Generation (4G) Long Term Evolution (LTE) base station (e.g., an eNodeB). Each access device 125 may include devices and/or components configured to enable cellular wireless communication with UE device 110. For example, access device 125 may include a radio frequency (RF) transceiver configured to communicate with UE devices using a 5G NR air interface, a 4G LTE air interface, and/or using another type of cellular air interface. Access device 125 may enable communication with core network 150 to enable core network 150 to authenticate and monitor network activity of UE device 110. According to one implementation, access network 120 may include a non-standalone (NSA) network to support dual coverage using 4G and 5G networks. In another implementation, access network 120 may include a 5G standalone (SA) architecture.

Each edge network 140 may be associated with one or more access devices 125 and may provide edge services for UE devices 110 attached to the access devices 125. Edge network 140 may be in proximity to the access devices 125 from a geographic and network topology perspective, thus enabling low latency communication with UE device 110 and/or access devices 125. As an example, edge network 140 may be located on a same site as one of the access devices 125. As another example, edge network 140 may be geographically closer to the access devices 125 and reachable via fewer network hops and/or fewer switches than other access devices 125 and/or data networks 190. Edge network 140 may include edge devices 145 that may be configured to provide various services and/or functions. Edge devices 145 may provide MEC services to UE device 110, such as, for example, services from an EAS.

Core network 150 may be managed by a provider of cellular wireless communication services and may manage communication sessions of subscribers connecting to core network 150 via access network 120. Core network 150 may include one or multiple networks of different types and technologies. For example, core network 150 may be implemented to include a next generation core (NGC) network for a 5G network, an Evolved Packet Core (EPC) of an LTE network, an LTE-A network, an LTE-A Pro network, another type of 4G core network, and/or a legacy core network.

Core network 150 may include various network devices 155. Depending on the implementation, network devices 155 may include 5G core network components (e.g., a User Plane Function (UPF), an Application Function (AF), an Access and Mobility Management Function (AMF), a Session Management Function (SMF), a Unified Data Management (UDM) function, a Network Slice Selection Function (NSSF), a Policy Control Function (PCF), a Unified Data Repository (UDR), a NWDAF, etc.), 4G core network components (e.g., a Serving Gateway (SGW), a Packet Data Network Gateway (PGW), a Mobility Management Entity (MME), a Home Subscriber Server (HSS), etc.), or another type of core network components (e.g., future 6G network components). In other implementation, network devices 155 may include combined 4G and 5G functionality, such as a session management function with PDN gateway-control plane (SMF+PGW-C) and a user plane function with PDN gateway-user plane (UPF+PGW-U).

Network device 155 may include a physical function node or a virtual network function (VNF). Thus, the components of core network 150 may be implemented as dedicated hardware components and/or as VNFs implemented on top of a commonly shared physical infrastructure using Software Defined Networking (SDN). The shared physical infrastructure may be implemented using one or more devices 300 described below with reference to FIG. 3 in a cloud computing center associated with core network 150. Additionally, or alternatively, some, or all, of the shared physical infrastructure may be implemented using one or more devices 300 included in edge device 145.

DNs 190 may each include a data network, such as a packet data network. A particular DN 190 may be associated with an Access Point Name (APN), and UE device 110 may request a connection to the particular packet data network 190 using the APN. DN 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows example components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
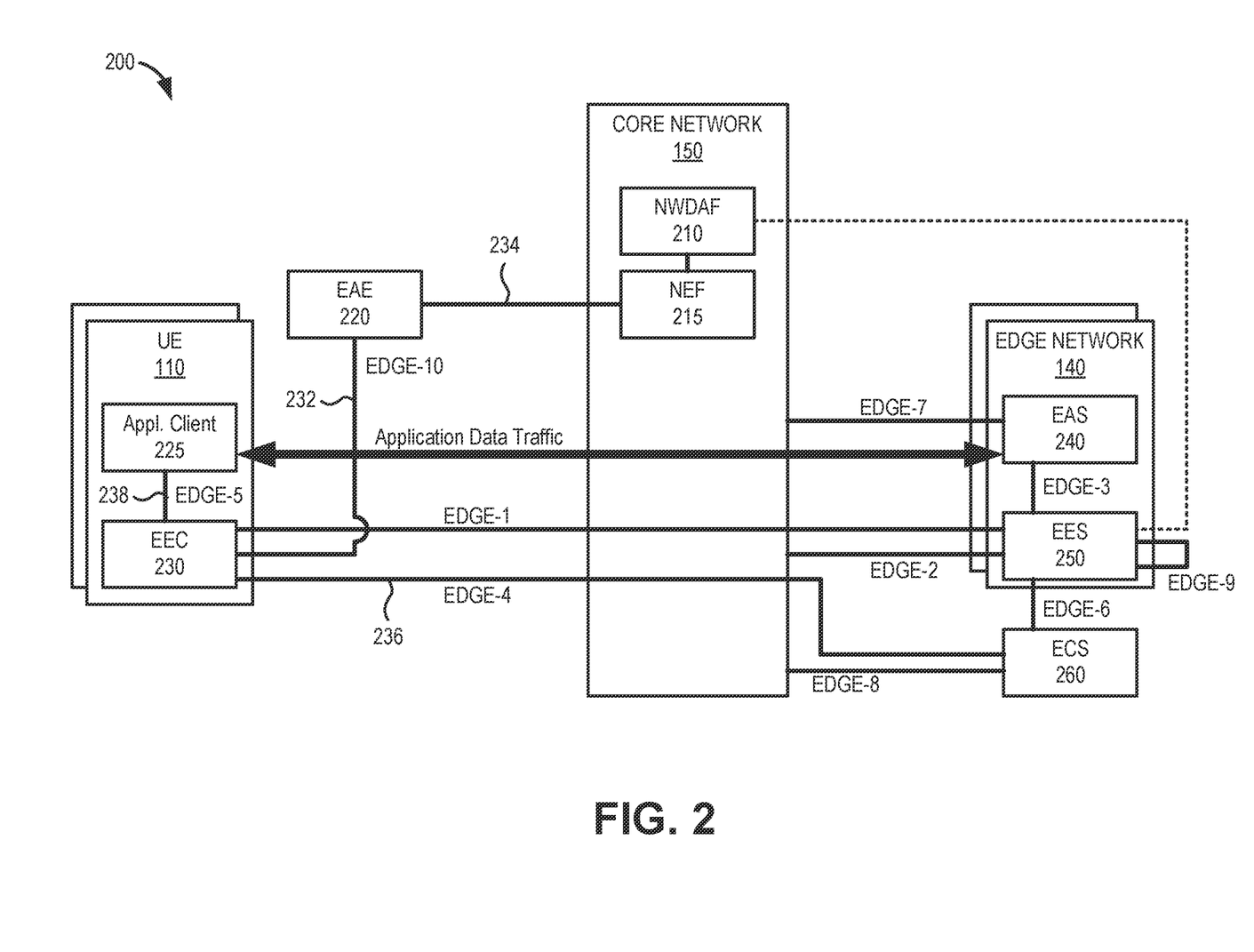
FIG. 2 is a diagram illustrating a portion of a network environment for exposing user-driven analytics for edge applications, according to an implementation described herein.

FIG. 2 is a diagram illustrating a network portion 200 that includes exemplary components of environment 100 for exposing user-driven analytics for edge applications, according to an implementation described herein. As shown in FIG. 2, network portion 200 may include a UE device 110 (also referred to as UE 110), edge network 140, core network 150, a NWDAF 210, a Network Exposure Function (NEF) 215, an Edge Analytics Engine (EAE) 220, and an Edge Configuration Server (ECS) 260. UE 110 may include an application client 225 and an EEC 230. Edge network 140 may include an Edge Application Server (EAS) 240 and an Edge Enabler Server (EES) 250. While FIG. 2 depicts a single instance of the network functions in network portion 200 for illustration purposes, in practice, there may be multiple instances of one or more network functions.

UE 110 may be configured to execute various types of software (e.g., applications, programs, etc.), such as an application client 225 for an application that receives service from EAS 240. EEC 230, EES, 250, and ECS 260 represent standardized component of mobile edge computing architecture. In the architecture of FIG. 2, EEC 230 and EES 250 allow application client 225 to discover the optimal EAS 240. Meanwhile, the ECS 260 may provide edge configuration information for EEC 230 so that EEC 230 can connect to the optimal EES 250. According to implementations described herein EAE 220 may provide new functionality to an edge ecosystem to enable capturing of UE analytics. Functionalities of ECS 260 and EEC 230 may be enhanced to facilitate interactions with EAE 220.

NWDAF 210 is an operator-managed network analytics logical function defined for 5G systems. NWDAF 210 may be responsible for providing network analysis information in response to requests from network functions. For example, NWDAF 210 may provide 5G analytics, closed loop automation, and machine learning. NWDAF 210 may provide a vendor agnostic solution for end-to-end analytics that consumes metrics and events from 5G core network functions (NFs) and operations, administration, and maintenance (OAM) platforms. According to implementations described herein, NWDAF 210 may also provide analytics of user data for edge applications. Currently, when operators deploy the NWDAF to obtain key performance indicators (KPIs) and another metrics, the NWDAF cannot incorporate user behavior data from edge networks. Currently, there is no standardized interface to extract edge-related metrics from application clients on UE devices. There is also no standardized interface to support EEC-NWDAF exchanges. Although shown as a single element in FIG. 2, in other implementations, NWDAF 210 may be a distributed component.

ECS 260 manages provisioning of edge configuration information to EEC 230. Provisioned information may include, for example, information for the EEC 230 to distinguish among multiple different EESs 250 and information for establishing a connection with EES 250. According to an implementation, ECS 260 may also provision information for establishing a connection with EAE 220. ECS 260 may communicate with EEC 230 via an EDGE-4 interface 236. The EDGE-4 interface 236 may be modified to permit transfer of information about EAE 220 to EEC 230 (e.g., information for establishing a connection with the EAE 220), in addition to provisioning of edge configuration information.

EEC 230 provides supporting functionalities for application client(s) 225. EEC 230 may retrieve configuration information to enable the exchange of application data traffic with EAS 240. EEC 230 may also perform discovery of an EAS 240 available in edge network 140 and detect UE 110 mobility events. According to an implementation, EEC 230 may collect user data (e.g., metrics) obtained from UE 110 and/or application client 225 that may be used for analytics, such as device details, application usage details, playback details, etc. A list of example metrics that EEC 230 may collect from UE 110/application client 225 is included in FIG. 4. EEC 230 may communicate with application client 225 via an EDGE-5 interface 238. EDGE-5 interface 238 may be modified to permit transfer of UE metrics to EEC 230.

EEC 230 may also push the collected user data to EAE 220. As indicated by reference 232, a new structuring interface, EDGE-10, may support communications between EEC 230 and EAE 220. Using the EDGE-10 interface, EEC 230 may register and deregister with an EAE 220. Once registered, EEC 230 may use the EDGE-10 interface to publish collected metrics to EAE 220.

Figure 5A:
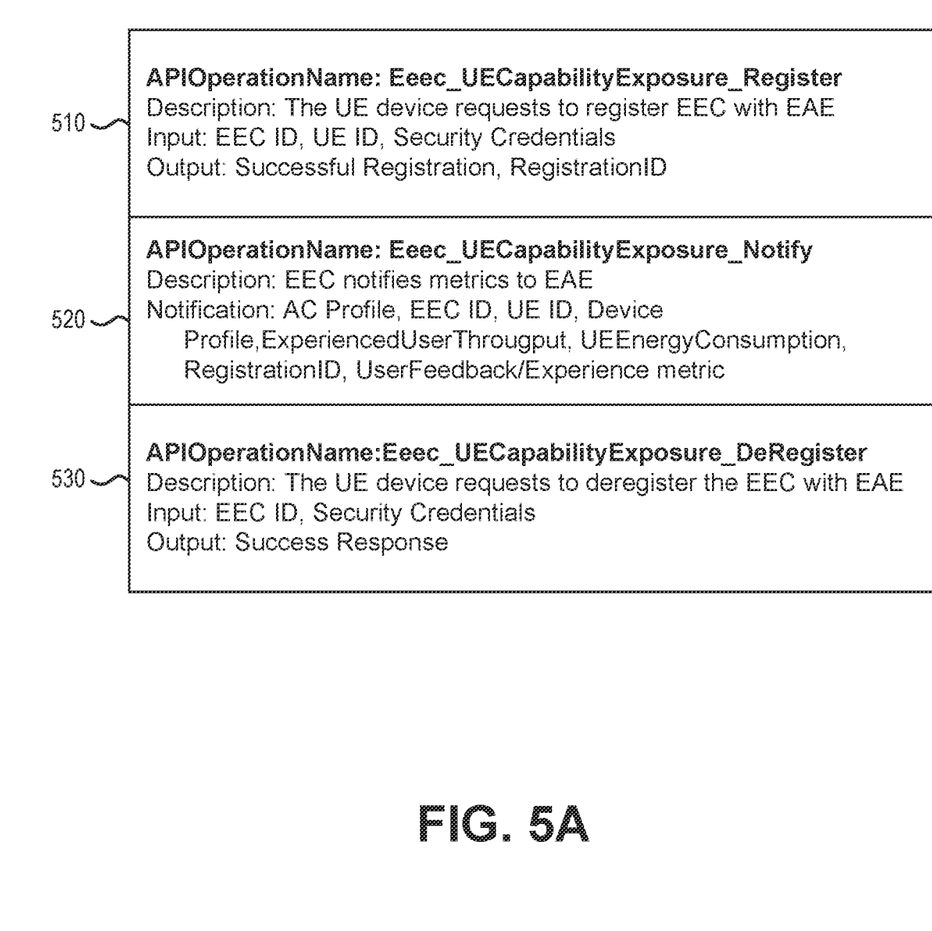
FIGS. 5A-5C are examples of Application Programming Interfaces (APIs) that may be used according to implementations described herein.

EAE 220 may include an application function (AF) to collect user data pushed from multiple EECs (including EEC 230) with which EAE 220 is registered. Using information from ECS 260, each EEC 230 may register with EAE 220 (e.g., via the EDGE-10 interface) to provide user data from UE 110/application client 225. EAE 220 may capture metrics from EEC 230 and any EECs on other UE 110/application client 225 that are associated, for example, with a particular edge location. EAE 220 and EEC 230 may communicate via application programming interfaces (APIs) over the EDGE-10 interface. Examples of APIs used on the EDGE-10 interface may include those shown in FIG. 5A. The example APIs may include API 510 to register an EEC with an EAE, API 520 for an EEC to provide metrics to EAE, and API 530 to deregister an EEC with the EAE.

Figure 5B:
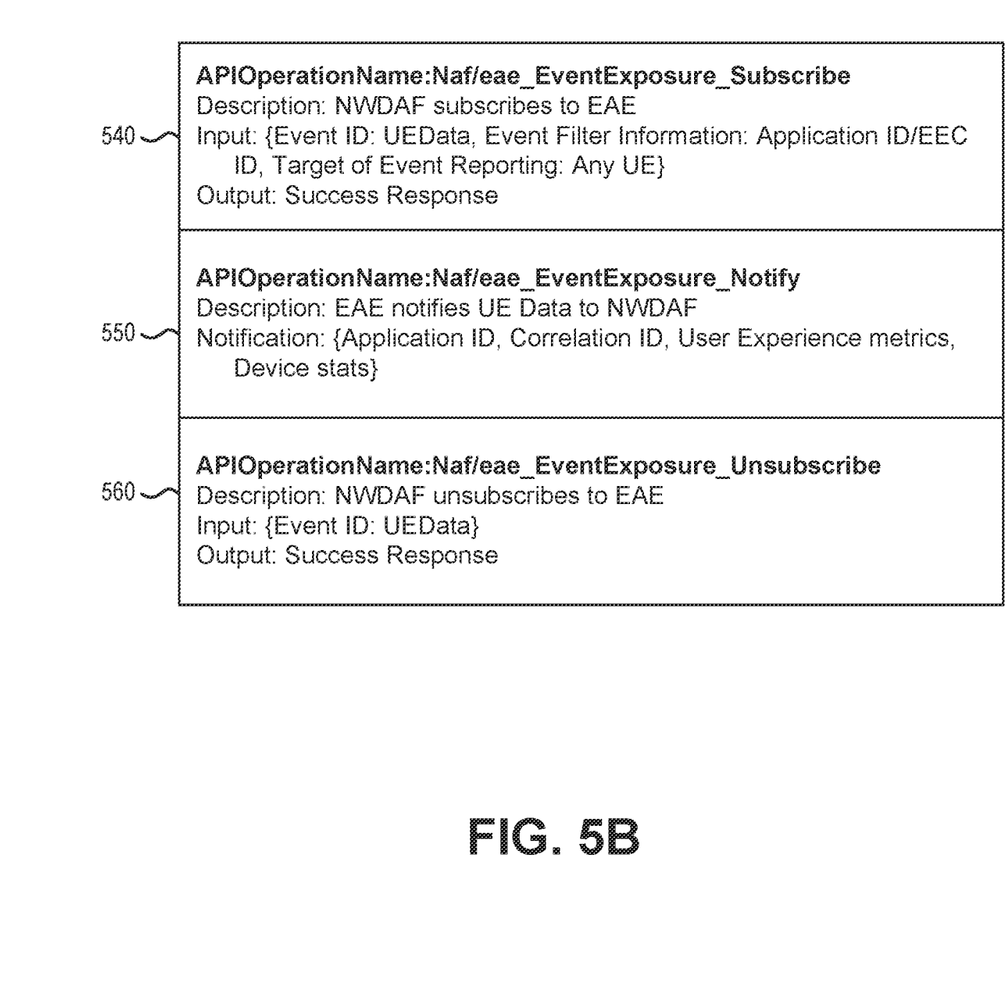

EAE 220 may be configured to act as an AF in network environment 100. Thus, EAE 220 may register with an NEF (e.g., NEF 215) to access elements in core network 150, such as NWDAF 210. EAE 220 may forward the collected data to NWDAF 210 via NEF 215, for example. EAE 220 and NWDAF 210 may communicate via APIs over a service-based interface 234 (e.g., an Nnef interface, an Naf interface, etc.). Examples of APIs used on service-based interface 234 may include those shown in FIG. 5B. The example APIs may include API 540 for the NWDAF to subscribe to the EAE, API 550 for EAE to the NWDAF of UE data, and API 560 for the NWDAF to unsubscribe to the EAE. According to an implementation, the capabilities of EAE 220 can be extended by capturing the analytics from a MEC Host and the deployed applications by using bidirectional APIs.

While some interfaces described herein may align with nomenclature of a 3GPP service-based architecture in a control plane of a 5G core network or edge network, for example, the exposure of user driven analytics for edge applications, as described herein, is not limited to such nomenclature and/or functionality. Additionally, according to some exemplary embodiments, interfaces described herein may operate according to some or all of the configurations and/or functionality defined by a standard (e.g., a 3GPP edge standard for an Eeec interface, a 3GPP standard for an Nnwdaf interface, a standard for a Naf interface associated with a standardizing body other than 3GPP, and so forth), the interfaces may additionally operate according to embodiments described herein, which have not been defined by any standard, for example. Furthermore, the interfaces according to various exemplary embodiments, are not limited to service-based interfaces, as mentioned above. For example, one or more of interfaces 232, 234, 236, and 238 may be implemented to include another type of interface.

Figure 3:
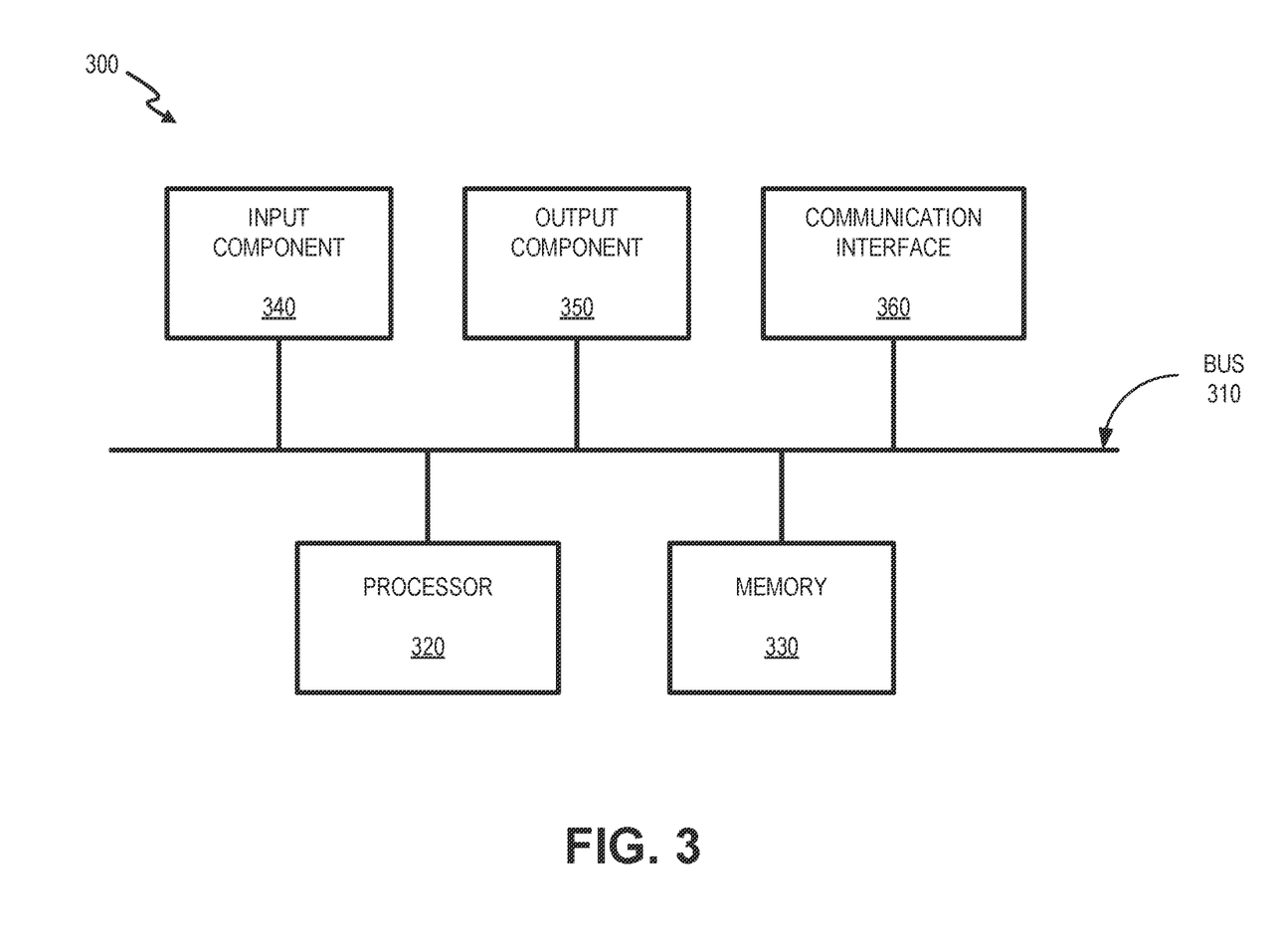
FIG. 3 is a diagram of example components of a device according to an implementation described herein.

FIG. 3 illustrates example components of a device 300 according to an implementation described herein. UE device 110, access device 125, edge device 145, network device 155, NWDAF 210, NEF 215, EAE 220, EAS 240, EES 250, and ECS 260 may each include one or more devices 300. Device 300 may include a bus 310, a processor 320, a memory 330, an input component 340, an output component 350, and a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Figure 4:
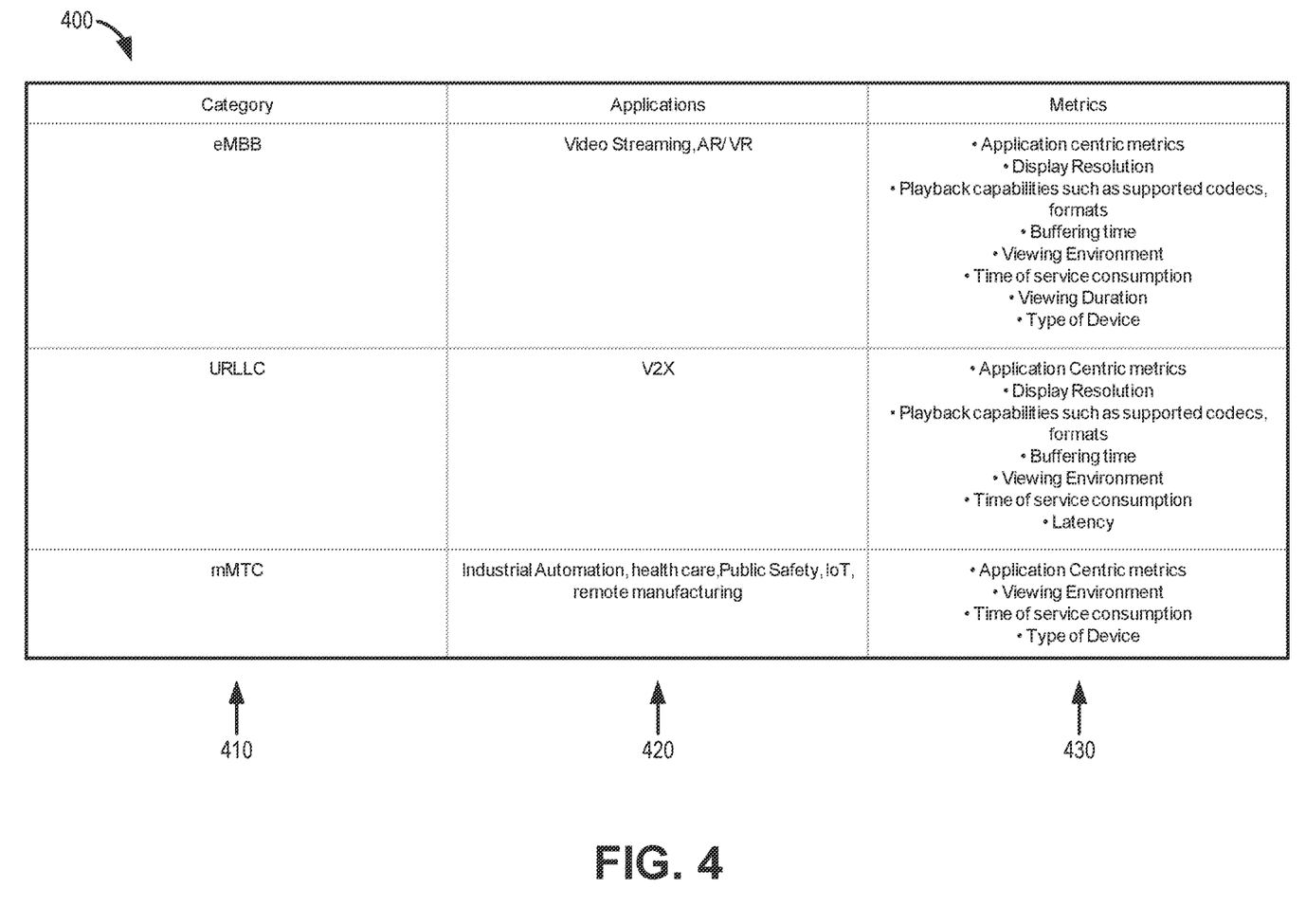
FIG. 4 is a table illustrating example metrics that an Edge Enabler Client (EEC) may collect and provide to an Edge Analytics Engine (EAE)

FIG. 4 is a table 400 illustrating example metrics that EEC 230 may collect from UE 110/application client 225 and provide to EAE 220. As illustrated, a table 400 may include a category field 410, an application identifier field 420, and a metrics field 430. Category field 410 may indicate a category of service to which a corresponding application (e.g., in application identifier field 420) may apply. As illustrated in FIG. 4, examples of service categories include, for example, enhanced mobile broadband (eMBB), Ultra-Reliable Low-Latency Communication (URLLC), massive machine-type communications (mMTC). Application identifier field 420 may store data that identifies an edge application or an application service using the corresponding service category (e.g., in a category field 410). Application identifier field 420 may indicate, for example, a type of application (e.g., video streaming, augmented reality (AR), virtual reality (VR), vehicle-to-everything (V2X), etc.) or a particular application (e.g., HULU, TWITCH, etc.). Metrics field 430 may include a type of user data that may be collected by EEC 230. According to other implementations, table 400 may include additional, fewer, and/or different metrics for that can be exposed for edge applications.

Figure 6:
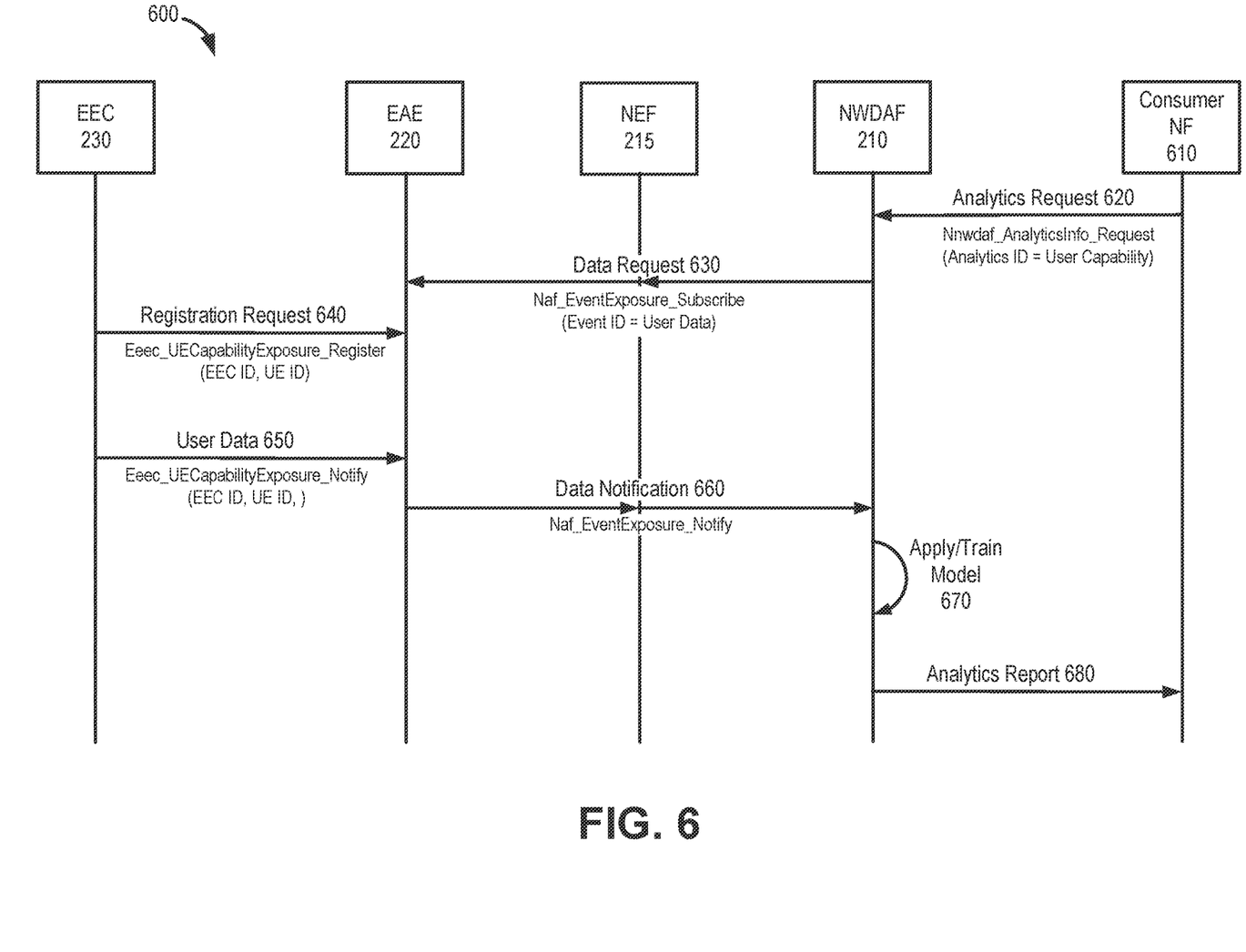
FIG. 6 is a signal flow diagram illustrating communications to expose user driven analytics for edge applications, according to an implementation described herein.

FIG. 6 is a signal flow diagram illustrating exemplary communications in a portion 600 of network environment 100 to expose user driven analytics for edge applications. As shown in FIG. 6, network portion 600 may include NWDAF 210, NEF 215, EAE 220, EEC 230, and a consumer network function (NF) 610. Communications in FIG. 6 reflect a request-response model for collecting user metrics. Communications shown in FIG. 6 provide simplified illustrations of communications in network portion 600 and are not intended to reflect every signal or communication exchanged between devices/functions. For example, communications described in FIG. 6 may be implemented via a subscription-notification model or a request-response model.

Figure 5C:
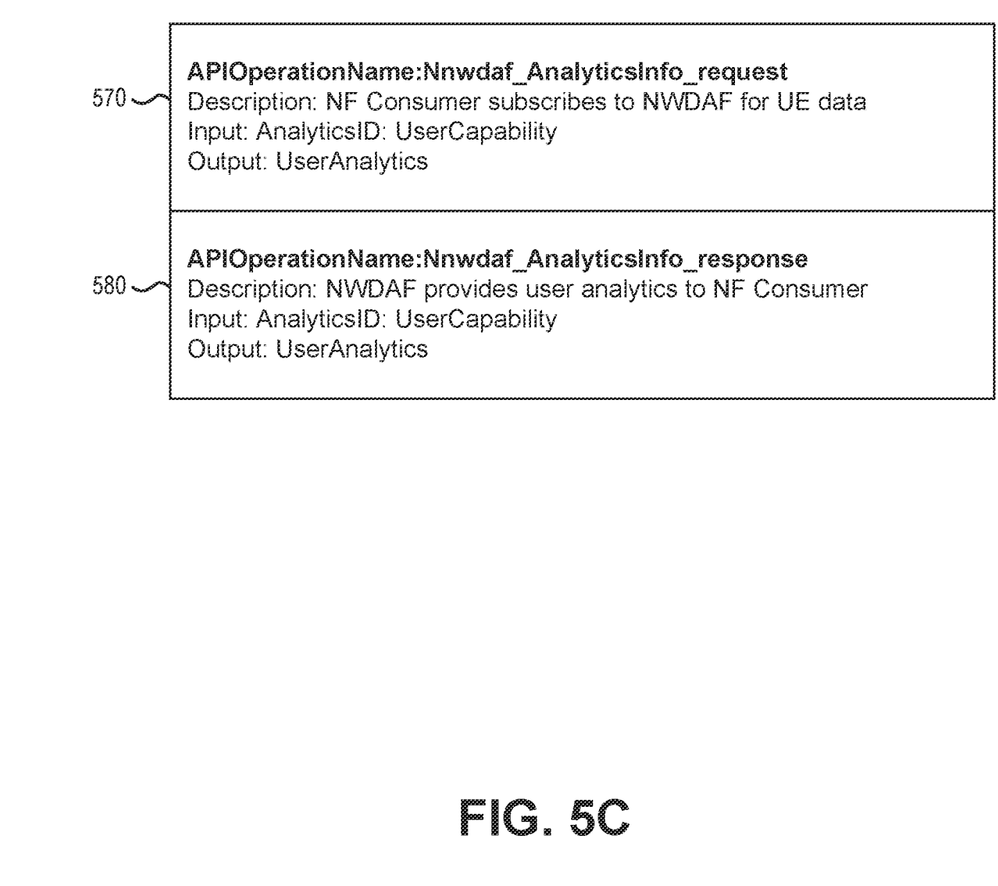

NF 610 may correspond, for example, to a network device in data network 190, which may be associated with an application provider (e.g., for EAS 240). NF 610 may communicate with NWDAF 210 to request analytic services. For example, NF 610 may user service-based interface to request and receive user analytics from NWDAF 210. Examples of APIs used to request and receive user analytics may include those shown in FIG. 5C.

As shown in FIG. 6, NF 610 (also referred to as a NF service consumer) may request an analytics service from NWDAF 210. For example, NF 610 may use API 570 to send an analytic information request 620 (e.g., a Nnwdaf_AnalyticsInfo_Request message) to NWDAF 210. Analytic information request 620 may include an analytics identifier for a particular service. In the example of FIG. 6, the analytics identifier may correspond to a user capability. In other implementations, analytics identifier may include a different analytics identifier (e.g., service experience, etc.).

NWDAF 210 may receive analytic information request 420 and, in response, may set up subscriptions to collect network data that supports the analytics service requested by NF 610. For example, NWDAF 210 may use API 540 to send a data request 630 (e.g., a Naf_EventExposure_Subscribe message) via NEF 215 to EAE 220 to subscribe to a data event from one or more EECs 230. In the example of FIG. 6, the event identifier may correspond to a user data.

EEC 230 may register with EAE 220 to provide user data. For example, EEC 230 may use API 510 to provide a registration request 640 (e.g., Eeec_UECapabilityExposure_Register) that includes an EEC identifier (ID) and UE identifier. After registration, EEC 230 may provide user data 650 to EAE 220. For example, EEC 230 may use API 520 to provide user data 650 (e.g., Eeec_UECapabilityExposure_Notify). to EAE 220. User data 650 may include the EEC ID, UE ID, an application client profile, a device profile, a user throughput experienced value, a UE energy consumption value, a user experience metric, etc. EAE 220 may receive the collect and compile the user data 650 with user data from other EECs 230.

In response to data request 630, EAE 220 may forward the user data to NWDAF 210 when certain conditions are met (e.g., when a particular network event occurs, a particular data threshold is reached, etc.). For example, EAE 220 may use API 550 to send a data notification 660 (e.g., a Naf_EventExposure_Notify message) to NWDAF 210 (e.g., via NEF 215) when the requested event data is generated. Data notification 660 may include, for example, an application ID, a correlation ID, user experience metrics, device statistics, etc.

NWDAF 210 may receive data notification 660 and may apply, train, and/or update an analytics model 670 that reflects a result/indicator for the requested analytics service (e.g., as requested, for example, by analytic information request 620). For example, NWDAF 210 may use ML techniques to generate statistical/predictive analytics based on the received user data. These statistics may contribute to a holistic view of users' capability at a particular edge location.

NWDAF 210 may provide an analytics report 680, based on the training model to NF 610. For example, NWDAF 210 may use API 580 to provide the requested analytics information (e.g., Nnwdaf_AnalyticsInfo_response) to NF 610. Analytics report may include, for example, user demographics, average device usage, device types, average bit rate, interests, and preferences that may provide a holistic view of the users capability at a particular edge location.

Figure 7:
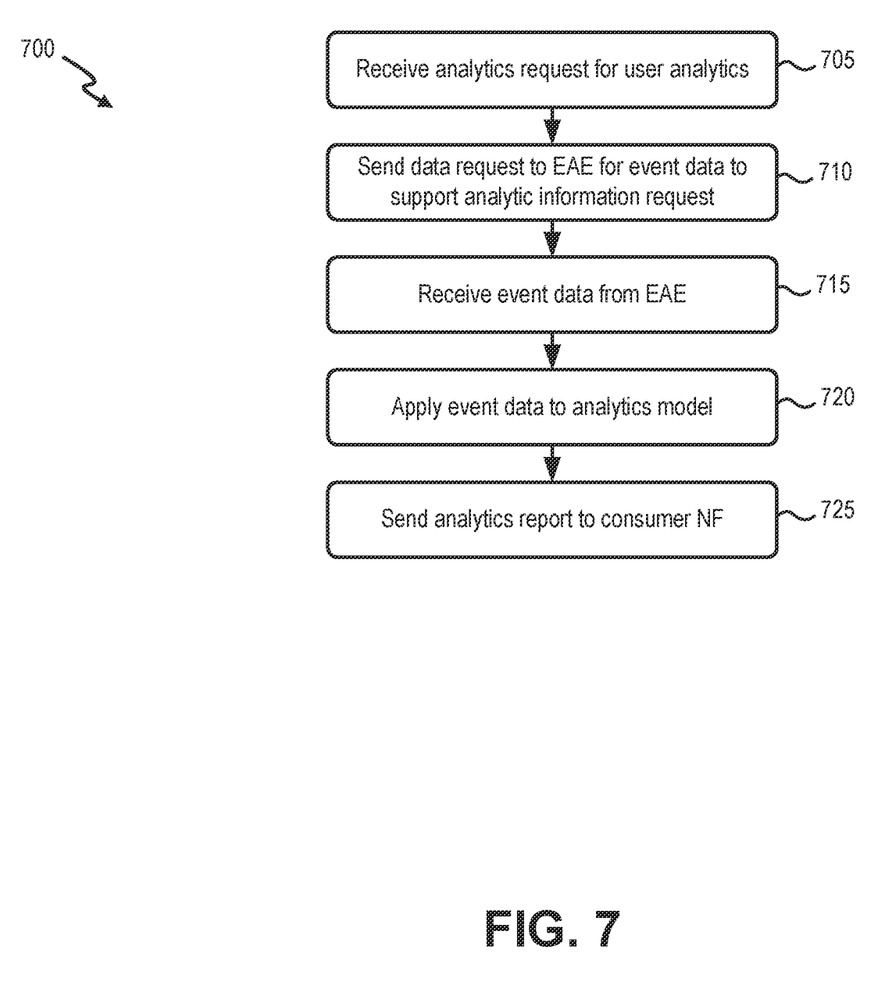
FIG. 7 is a flow diagram illustrating an example process for providing user-driven analytics for edge applications, according to an implementation described herein.

FIG. 7 is a flow diagram illustrating an example process 700 for providing user-driven analytics for edge applications, according to an implementation described herein. In one implementation, process 700 may be implemented by NWDAF 210 in conjunction with one or more other network devices in network environment 100. In another implementation, process 700 may be implemented by EAE 220 in conjunction with one or more other network devices in network environment 100.

Process 700 may include receiving an analytics request for user analytics for an edge application (block 705) and sending a data request to an EAE based on the analytics request (block 710). For example, consumer NF 610 may send an analytics request (e.g., an Nnwdaf_AnalyticsSubscription_Subscribe message or an Nnwdaf_AnalyticsInfo_Request message) with a analytics ID of "user capability" to NWDAF 210 to request reports associated with a user driven analytics for edge applications. In response, NWDAF 210 may identify KPIs/data needed for the requested report and send to EAE 220 a data request (e.g., an Ntsctsf_EventExposure_Subscribe message) via interface 234 to subscribe to or request the necessary KPIs/data.

Process 700 may further include receiving event data from the EAE (block 715). For example, one or more EECs 230 may register with EAE 220 (e.g., based on EAE connection information EECs 230 receive from ECS 260). EECs 230 may use EDGE-10 interface 232 to provide user data (e.g., user experience metrics for the edge application and/or device statistics for the UE device) to EAE 220. EAE 220 may compile the user data, if necessary, and provide responsive data to NWDAF 210. EAE 220 may forward the user data to NWDAF 210 via NEF 215 (e.g., using an Ntsctsf_EventExposure_Notify message). For example, using interface 234, EAE 220 may provide the user data to NWDAF 210 periodically, continuously, at designated times, etc. NWDAF 210 may receive the user data response to the analytics request.

Process 700 may also include applying the event data to an analytics model (block 720) and sending the analytics report to the consumer NF (block 725). For example, NWDAF 210 may apply an analytics model that uses the requested KPIs/user data to generate an analytics report for the edge application. NWDAF 210 may forward to the consumer NF (e.g., NF 610) the analytics report for the edge application.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, and message/operation flows with respect to FIG. 6, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
  sending, by an Edge Configuration Server (ECS) and to an Edge Enabler Client (EEC) on a User Equipment (UE) device:
    first information for the UE device to establish via a first type of interface a connection with an Edge Analytics Engine (EAE) associated with an edge location, and second information for the UE device to establish via a second type of interface a connection with an Edge Enabler Server (EES);

receiving, by a Network Data Analytics Function (NWDAF) in a core network, an analytics request for user analytics for an edge application that uses the edge location;

sending, by the NWDAF and to the EAE, a data request based on the analytics request;

receiving, by the EAE via the first type of interface, user data from the EEC;

forwarding, by the EAE, the user data to the NWDAF;

receiving, by the NWDAF, the user data responsive to the analytics request; and generating, by the NWDAF, an analytics report of predicted capabilities of the UE device at the edge location, with respect to the edge application, based on the user data.

2. The method of claim 1, wherein the analytics request includes an analytics identifier for a user device capability.

3. The method of claim 1, wherein receiving the analytics request includes:
receiving, from a consumer network function, the analytics request as one of a request-response model or a subscription-notification model.

4. The method of claim 1, wherein sending the data request includes sending the data request to the EAE via a standardized interface.

5. The method of claim 1, wherein forwarding the user data to the NWDAF includes:
forwarding user experience metrics for the edge application and device statistics for the UE device.

6. The method of claim 1, wherein forwarding the user data to the NWDAF further comprises:
compiling, by the EAE, the user data with other user data from multiple UE devices.

7. The method of claim 1, wherein generating the analytics report further comprises:
applying the user data to a Machine Learning (ML) analytics model.

8. The method of claim 1, wherein receiving the user data from the EEC includes:
receiving the user data via a standardized interface between the EAE and the EEC.

9. The method of claim 1, further comprising:
registering, by the EAE, the EEC on the UE device to expose the user data.

10. The method of claim 1, wherein forwarding the user data to the NWDAF comprises:
registering with the NWDAF via a network exposure function (NEF).

11. A system comprising:
an Edge Configuration Server (ECS) including a first processor to send, to an Edge Enabler Client (EEC) on a User Equipment (UE) device:
first information for the UE device to establish via a first type of interface a connection with an Edge Analytics Engine (EAE) associated with an edge location, and
second information for the UE device to establish via a second type of interface a connection with an Edge Enabler Server (EES);
a Network Data Analytics Function (NWDAF) including a second processor to:
receive an analytics request for user analytics for an edge application that uses the edge location,
send, to the EAE, a data request based on the analytics request; and
the EAE including a third processor to:
receive, via the first type of interface, user data from the EEC, and
forward the user data to the NWDAF in response to the data request,
wherein the second processor is further configured to:
receive the user data responsive to the analytics request, and
generate an analytics report of predicted capabilities of the UE devices at the edge location, with respect to the edge application, based on the user data.

12. The system of claim 11, wherein the analytics request includes an analytics identifier for a user device capability.

13. The system of claim 11, wherein, when receiving the analytics request, the second processor is further to:
receive, from a consumer network function, the analytics request as one of a request-response model or a subscription-notification model.

14. The system of claim 11, wherein, when sending the data request, the second processor is further to:
send the data request to the EAE via a standardized service-based interface.

15. The system of claim 11, wherein, when forwarding the user data to the NWDAF, the third processor is further to:
forward user experience metrics for the edge application and device statistics for the UE device.

16. The system of claim 11, wherein, when forwarding the user data to the NWDAF, the third processor is further to:
compile the user data with other user data from multiple UE devices.

17. The system of claim 11, wherein, when generating the analytics report, the second processor is further to:
apply the user data to a Machine Learning (ML) analytics model.

18. A non-transitory computer-readable medium containing instructions executable by at least one processor of an application function (AF), the computer-readable medium comprising the instructions for:
receiving, from a Network Data Analytics Function (NWDAF), a data request based on an analytics request provided to the NWDAF from a consumer network function, for user analytics for an edge application;
receiving user data from an Edge Enabler Client (EEC) on a User Equipment (UE) device connected to an edge location, wherein the user data is received via a first type of interface that is different than a second type of interface between an Edge Enabler Server (EES) and the EEC; and
forwarding the user data to the NWDAF in response to the data request.

19. The non-transitory computer-readable medium claim 18, wherein the instructions for forwarding the user data to the NWDAF further comprise instructions for:
forwarding user experience metrics for the edge application and device statistics for the UE device.

20. The non-transitory computer-readable medium claim 18, wherein the instructions for forwarding the user data to the NWDAF further comprise instructions for:
compiling, prior to the forwarding, the user data with other user data from multiple UE devices.

* * * * *